(12) United States Patent
Cerri et al.

(10) Patent No.: US 11,199,832 B2
(45) Date of Patent: Dec. 14, 2021

(54) MANAGING ACTIVITIES ON INDUSTRIAL PRODUCTS ACCORDING TO COMPLIANCE WITH REFERENCE POLICIES

(71) Applicant: INTERNATIONAL BUSINESS MACHINES CORPORATION, Armonk, NY (US)

(72) Inventors: Fabio Cerri, Rome (IT); Alice Guidotti, Rome (IT); Bernardo Pastorelli, Rome (IT); Leonardo Rosati, Rome (IT)

(73) Assignee: International Business Machines Corporation, Armonk, NY (US)

( * ) Notice: Subject to any disclaimer, the term of this patent is extended or adjusted under 35 U.S.C. 154(b) by 636 days.

(21) Appl. No.: 15/878,955

(22) Filed: Jan. 24, 2018

(65) Prior Publication Data
US 2019/0227530 A1   Jul. 25, 2019

(51) Int. Cl.
G05B 19/418 (2006.01)

(52) U.S. Cl.
CPC ............ G05B 19/4184 (2013.01); G05B 2219/31025 (2013.01)

(58) Field of Classification Search
None
See application file for complete search history.

(56) References Cited

U.S. PATENT DOCUMENTS

| | | | |
|---|---|---|---|
| 8,005,777 B1 | 8/2011 | Owen et al. | |
| 8,949,825 B1 * | 2/2015 | Fitzgerald | G06F 21/53 718/1 |
| 9,967,285 B1 * | 5/2018 | Rossman | G06F 16/22 |
| 2004/0088177 A1 | 5/2004 | Travis et al. | |
| 2008/0249837 A1 | 10/2008 | Angell et al. | |
| 2010/0125662 A1 * | 5/2010 | Ou | H04L 63/20 709/224 |
| 2012/0284080 A1 | 11/2012 | De Oliveira et al. | |
| 2013/0297372 A1 | 11/2013 | Rix | |
| 2014/0019180 A1 | 1/2014 | Ahern et al. | |

(Continued)

FOREIGN PATENT DOCUMENTS

WO   2016130971 A1   8/2016

OTHER PUBLICATIONS

Rodriguez et al., SOA-Enabled Compliance Management Instrumenting, Assessing and Analyzing Service-Based Business Processes, Dec. 2013 (Year: 2013).*

(Continued)

*Primary Examiner* — Patricia H Munson
*Assistant Examiner* — Chesiree A Walton
(74) *Attorney, Agent, or Firm* — L. Jeffrey Kelly

(57) ABSTRACT

A solution is proposed for managing one or more industrial products. A method, computer system, and computer program product for creating a reference model providing a formal representation of reference policies according to reference artifacts and creating corresponding activity models providing a formal representation of activities (to be performed on the industrial products) according to corresponding activity artifacts; alignment indicators indicative of an alignment of the activities with the reference policies are calculated according to a comparison between the corresponding activity models and the reference model.

20 Claims, 8 Drawing Sheets

(56) References Cited

U.S. PATENT DOCUMENTS

| | | | |
|---|---|---|---|
| 2016/0080422 A1* | 3/2016 | Belgodere | G06N 5/046 |
| | | | 706/47 |
| 2016/0274558 A1* | 9/2016 | Strohmenger | G05B 19/0428 |
| 2017/0364824 A1* | 12/2017 | Boyer | G06Q 10/0833 |
| 2018/0188704 A1* | 7/2018 | Celia | G05B 19/4183 |
| 2019/0026675 A1* | 1/2019 | McKibbin | G06Q 10/06393 |
| 2019/0163446 A1* | 5/2019 | Brunel | G06F 11/3604 |

OTHER PUBLICATIONS

Schwenk, "Cognitive simplification processes in strategic decision-making", Strategic Management Journal—Wiley Online Library, vol. 5, Issue 2, Apr./Jun. 1984, pp. 111-128, Abstract Only—pp. 1-3.

Amit et al., "Strategic assets and organizational rent", Strategic Management Journal—Wiley Online Library, vol. 14, Issue 1, pp. 33-46, Jan. 1993, Abstract Only—pp. 1-5.

Mell et al., "The NIST Definition of Cloud Computing," U.S. Department of Commerce, National Institute of Standards and Technology, Sep. 2011, p. 1-7, Special Publication 800-145.

\* cited by examiner

MANAGING ACTIVITIES ON INDUSTRIAL PRODUCTS ACCORDING TO COMPLIANCE WITH REFERENCE POLICIES

BACKGROUND

The present invention relates, generally, to the field of information technology, and more particularly to management of industrial products.

The background of the present disclosure is hereinafter introduced with the discussion of techniques relating to its context. However, even when this discussion refers to documents, acts, artifacts and the like, it does not suggest or represent that the discussed techniques are part of the prior art or are common general knowledge in the field relevant to the present disclosure.

The management of industrial products is generally quite complex; particularly, it may be difficult to ensure that activities to be performed on the industrial products by corresponding subjects are aligned with one or more reference policies of an entity associated therewith (for example, defining its strategy). A typical scenario is in the information technology field, wherein an (information technology) company may be in charge of information technology systems of its customers; in this case, projects relating to the information technology systems involve the execution thereon of activities by employees of the company, which activities should be aligned with the strategy of the company as much as possible.

For this purpose, several tools have been proposed aimed at facilitating the alignment with the reference policies. For example, meetings, courses or similar events are typically used to train the involved subjects; moreover, incentive plans may be put in place for pushing the subjects to align with the strategies.

However, these tools may be ineffective especially in very dynamic environments wherein the reference policies change continually (like in the information technology market). Indeed, the trends of the information technology market evolve at high speed; this requires a corresponding high transformation rate for (information technology) companies desiring to be competitive. Therefore, the strategies of the companies are always in the middle of transformations (with the strategies that may change even while their implementation is still in progress). A typical example is in companies moving from traditional (information technology) environments to new environments, like based on social and cloud paradigms.

However, this high dynamicity makes it very difficult, if not impossible, to maintain the involved subjects correctly trained about the reference policies. Moreover, corresponding decisions are very often to be taken under pressure (for example, when a deal has to be closed or an architecture has to be defined); in these situations, it is commonplace to rely mainly on personal knowledge, with the risk of disregarding the reference policies. All of the above is particularly evident in large companies, with a very high number of employees working on heterogeneous information technology systems of their customers.

As a result, in general many activities that are performed onto the industrial products may be not aligned (at least in part) with the reference policies. This leads to an ineffective exploitation of available resources (necessarily limited) that may be allocated to the industrial products, with a detrimental effect on their performance.

For example, referring again to a company in the information technology market, the activities that are non-aligned with its strategy may involve the implementation of information technology systems based on structures different from the ones on which the company has decided to invest. Therefore, this may lead to shortage of hardware/software resources (like processing power, memory space, network bandwidth), such as when a service is implemented onto a data center that is planned to be downgraded; moreover, this may lead to more problems and longer times for their solutions, such as when hardware/software components are used that are planned to be dismissed.

SUMMARY

A simplified summary of the present disclosure is herein presented in order to provide a basic understanding thereof; however, the sole purpose of this summary is to introduce some concepts of the disclosure in a simplified form as a prelude to its following more detailed description, and it is not to be interpreted as an identification of its key elements nor as a delineation of its scope.

In general terms, the present disclosure is based on the idea of creating models for controlling the execution of activities onto industrial products.

Particularly, an aspect provides a method for managing one or more industrial products. A corresponding method comprises creating a reference model providing a formal representation of reference policies according to reference artifacts and creating corresponding activity models providing a formal representation of activities (to be performed on the industrial products) according to corresponding activity artifacts; alignment indicators indicative of an alignment of the activities with the reference policies are calculated according to a comparison between the corresponding activity models and the reference model.

A further aspect provides a computer program for implementing the method.

A further aspect provides a corresponding computer program product.

A further aspect provides a corresponding system.

More specifically, one or more aspects of the present disclosure are set out in the independent claims and advantageous features thereof are set out in the dependent claims, with the wording of all the claims that is herein incorporated verbatim by reference (with any advantageous feature provided with reference to any specific aspect that applies mutatis mutandis to every other aspect).

BRIEF DESCRIPTION OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. In the description, details of well-known features and techniques may be omitted to avoid unnecessarily obscuring the presented embodiments.

Referring to FIGS. 1A, 1B, 1C, and 1D, the general principles are shown of a solution, according to an embodiment.

Figure 1A:
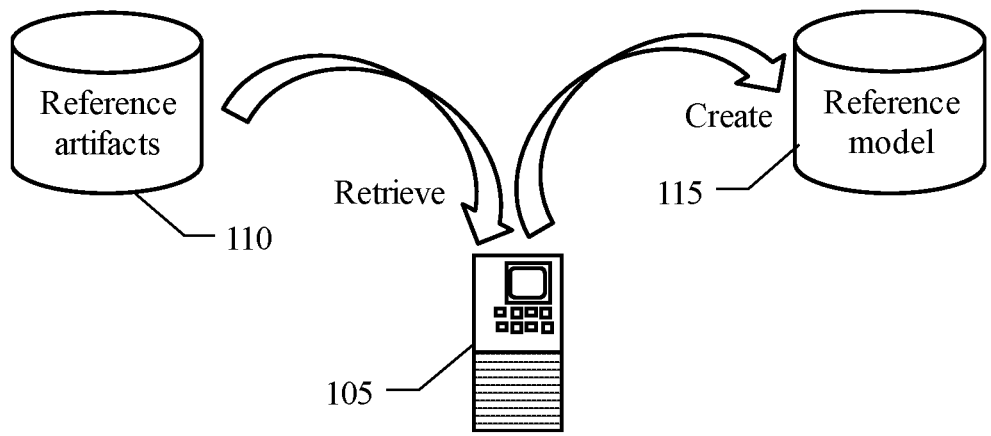
FIGS. 1A, 1B, 1C, and 1D illustrates the general principles of a solution, according to an embodiment.

As shown in FIG. 1A, a computing system 105 may retrieve one or more reference artifacts 110, for example, images and documents. The one or more reference artifacts 110 may be indicative of one or more reference policies of an entity associated with one or more industrial products. An entity may include an information technology company, or company, in charge of information technology systems of its customers. In an example, the one or more reference polices may include guiding policies to be implemented by employees of the company working on the information technology systems for implementing a strategy defining one or more high-level goals of the company. The one or more reference artifacts 110 may be retrieved from a memory of the computing system 105, for example, from a repository storing strategic publications and communications of the company. The computing system 105 may create a reference model 115 according to the one or more reference artifacts 110, for example, by applying cognitive techniques. The reference model 115 may provide a formal representation of the reference policies, for example, in terms of a mathematical model conforming to a predefined formalism.

Figure 1B:
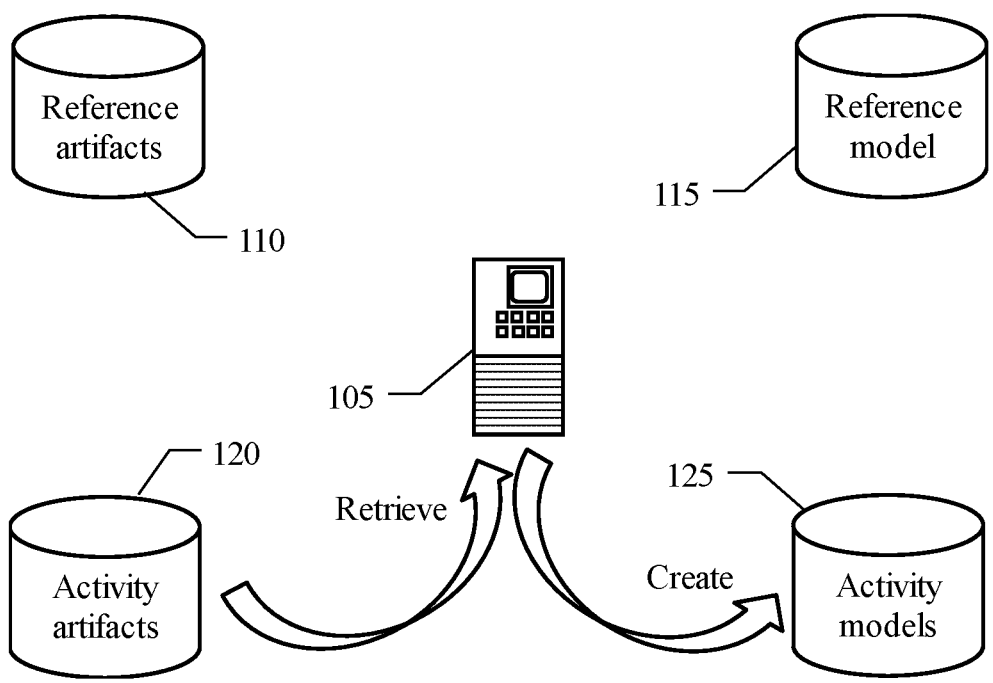

As shown in FIG. 1B, the computing system 105 may retrieve one or more activity artifacts 120, which are indicative of one or more activities to be performed on the information technology systems. An example of one or more activities to be performed may include, for example, images and documents relating to different projects that are in progress on the information technology systems. The one or more activity artifacts 120 may be retrieved from the memory of the computing system 105, for example, from a repository storing project specifications and customer communications. The computing system 105 may correspond to the one or more activities, according to the one or more activity artifacts 120, for example, by applying cognitive techniques. The one or more activity models 125 may provide a formal representation of the one or more activities, for example, in terms of mathematical models conforming to the same formalism of the reference model.

Figure 1C:
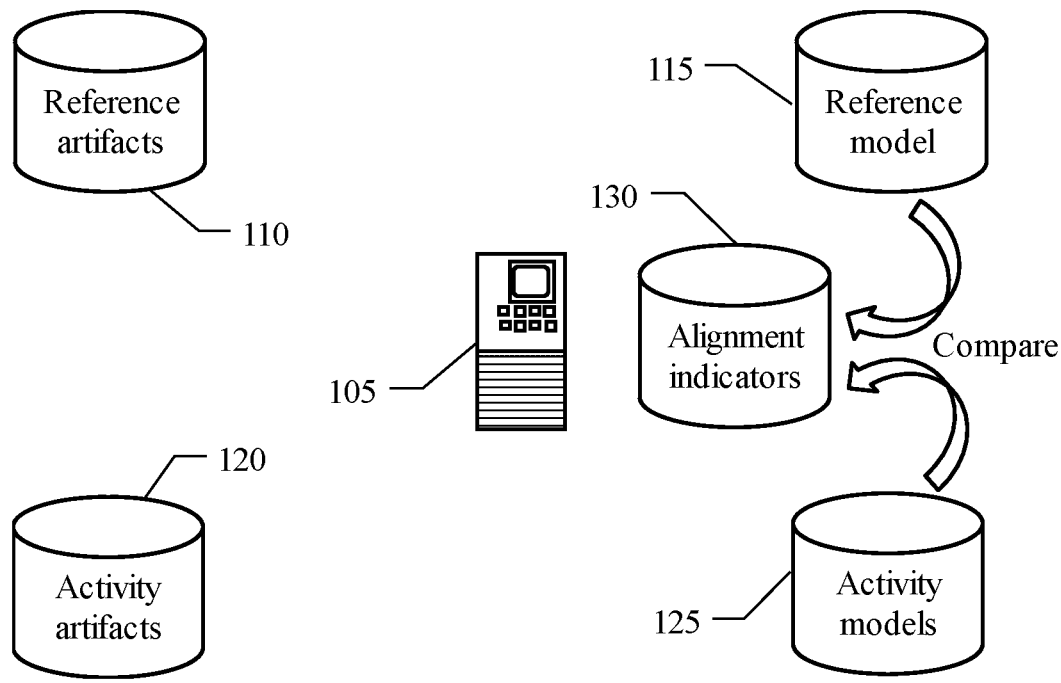

As shown in FIG. 1C, the computing system 105 may calculate one or more alignment indicators 130 corresponding to a comparison between the one or more activity models 125 and the reference model 115, for example, according to a compliance index and a non-compliance index of each of the one or more activity models 125 that are based on a matching of each of the one or more activity models 125 with the reference model 115 relating to information technology solutions that are compliant and non-compliant, respectively, with the reference policies. The one or more alignment indicators 130 may be indicative of an alignment of the activities with the reference policies, for example, in binary form.

Figure 1D:
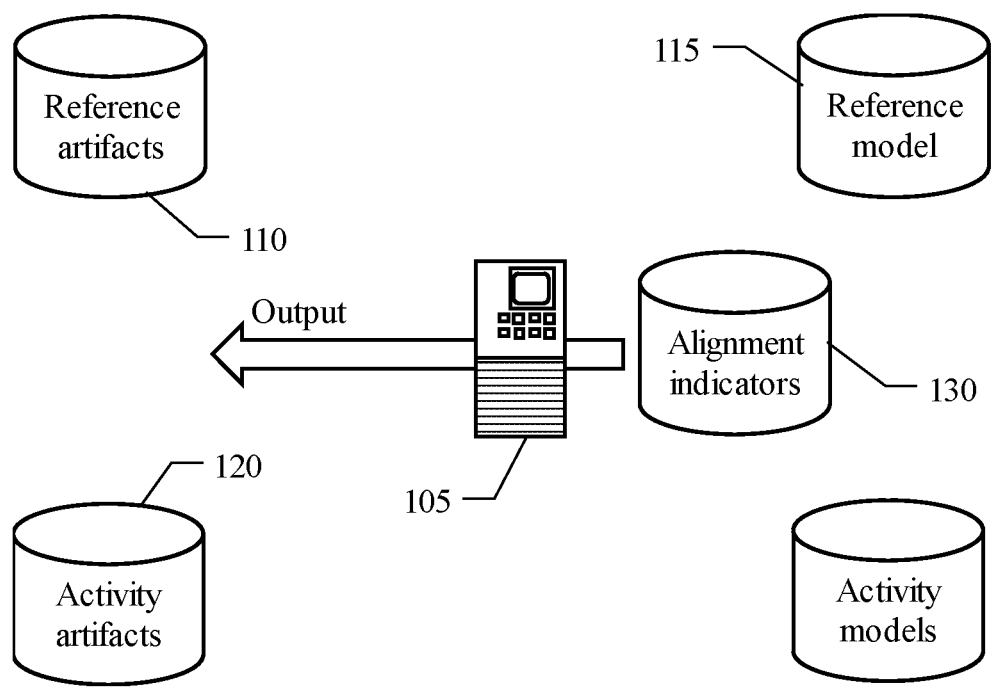

As shown in FIG. 1D, the computing system 105 may output an indication of the one or more alignment indicators 130, for example, by displaying them on a monitor. The one or more alignment indicators 130 provided may be used to manage the information technology systems; particularly, an execution of the activities is controlled according to the corresponding alignment indicators, for example, by enabling or preventing an activity.

The previously described solution may significantly improve an alignment of the one or more activities with the reference policies, and with the strategy of the company in the example at issue.

This result may be achieved automatically, with no or reduced human intervention. Therefore, the reference/activity models may be created, and the alignment indicators may be determined substantially in real-time. As a result, it is possible to verify the alignment of the activities with the reference policies and then to act accordingly in the day-by-day work; particularly, this is possible in very dynamic environments as well wherein the reference policies change continually, such as in the information technology market, even when corresponding decisions are to be taken under pressure.

The increased alignment of the activities with the reference policies may significantly improves the exploitation of available resources that may be allocated to the industrial products, with a beneficial effect on their performance. For example, in the scenario at issue this prevents or substantially reduces the risk of implementing the information technology systems based on structures different from the ones on which the company has decided to invest. Therefore, this may provide higher availability of hardware/software resources (such as processing power, memory space and network bandwidth); moreover, this may provide lower rate of problems and shorter times for their solutions.

The previous embodiment may allow exploiting any changing strategies at their best, thereby providing a significant competitive advantage for the company.

Figure 2:
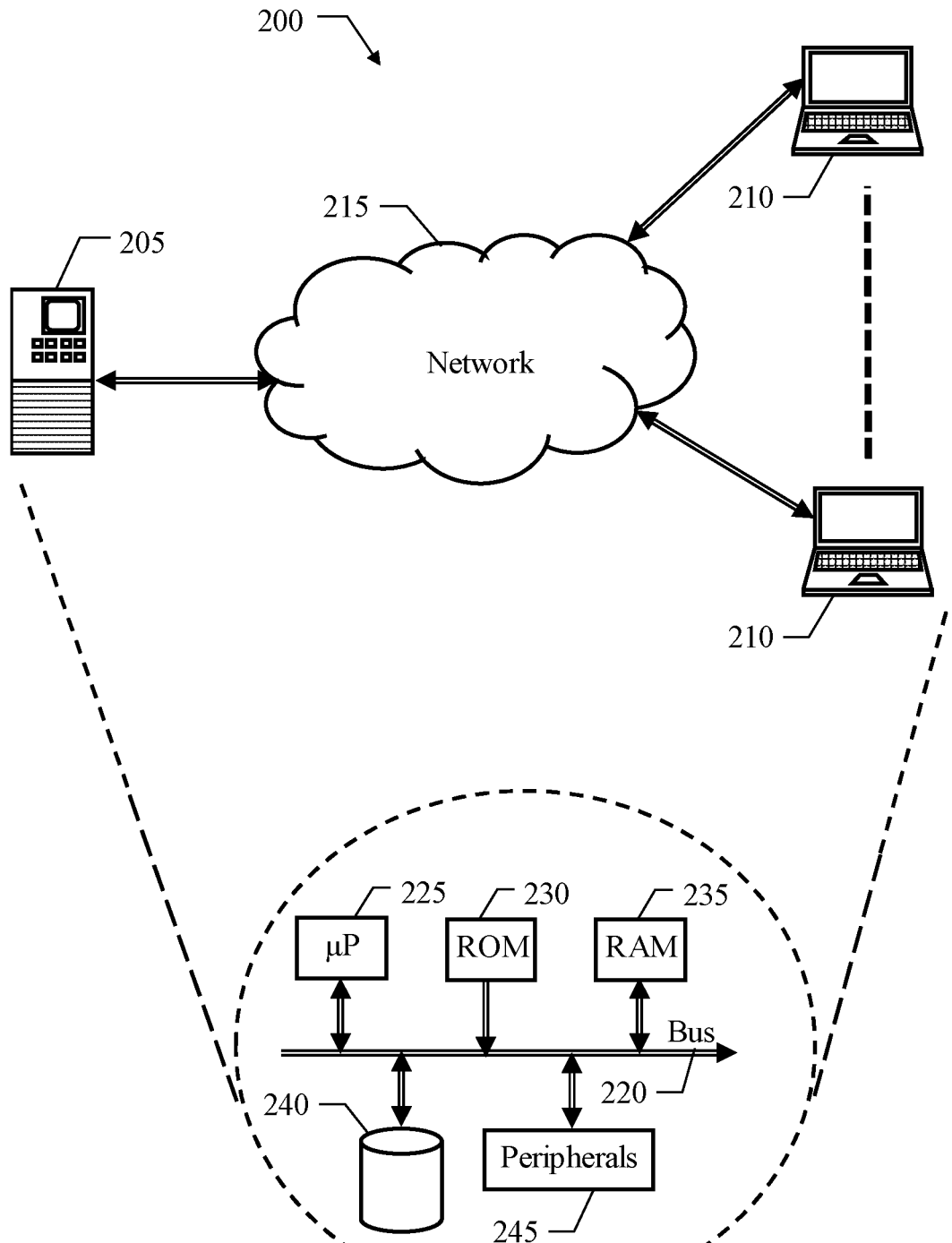
FIG. 2 illustrates a schematic block diagram of a computing infrastructure, according to an embodiment.

Referring to FIG. 2, a schematic block diagram is shown of a computing infrastructure 200, according to an embodiment.

The computing infrastructure 200 may include a server computing machine 205, or server 205, which may offer a service for managing information technology systems of customers of a company. For this purpose, users of the company, for example, employees and executives, access the server 205 by means of one or more client computing machines, or a client 210, for example a laptop, a tablet, or a smartphone. Typically, the computing infrastructure 200 may have a distributed architecture with the server 205 and the client 210 which communicate over a network 215, for example, of global type based on the Internet.

Each of the above-mentioned computing machines (server 205 and clients 210) may include several units that are connected, for example, through a bus structure 220 with one or more levels. The server 205 and the client 210 may each include one or more microprocessors (µP) 225, which may control operation of the server 205 and the clients 210, a non-volatile memory (ROM) 230, which may store basic code for a bootstrap of the server 205 and the clients 210, and a volatile memory (RAM) 235, which may be used as a working memory by the one or more microprocessors 225. The server 205 and the clients 210 may each be provided with a mass-memory 240 for storing programs and data, for example, storage devices of a data center, not shown in the figure, wherein the server 205 is implemented, and corresponding hard disks for the clients 210. Moreover, the server 205 and the clients 210 may each comprise a number of controllers for peripheral (or Input/Output, I/O) units 245; for example, the peripheral units 245 of the server 205 may comprise a network card for plugging the server 205 into the data center and then connecting it to a console for a control, for example, a personal computer provided with a drive for reading/writing removable storage units, such as optical disks like DVDs, and to a switch/router sub-system of the data center for communication with the network 215, where the peripheral unit 245 of each client 210 may comprise a keyboard, a mouse, a monitor, a network adapter for connecting to the network 215 and a drive for reading/writing removable storage units as above.

Figure 3:
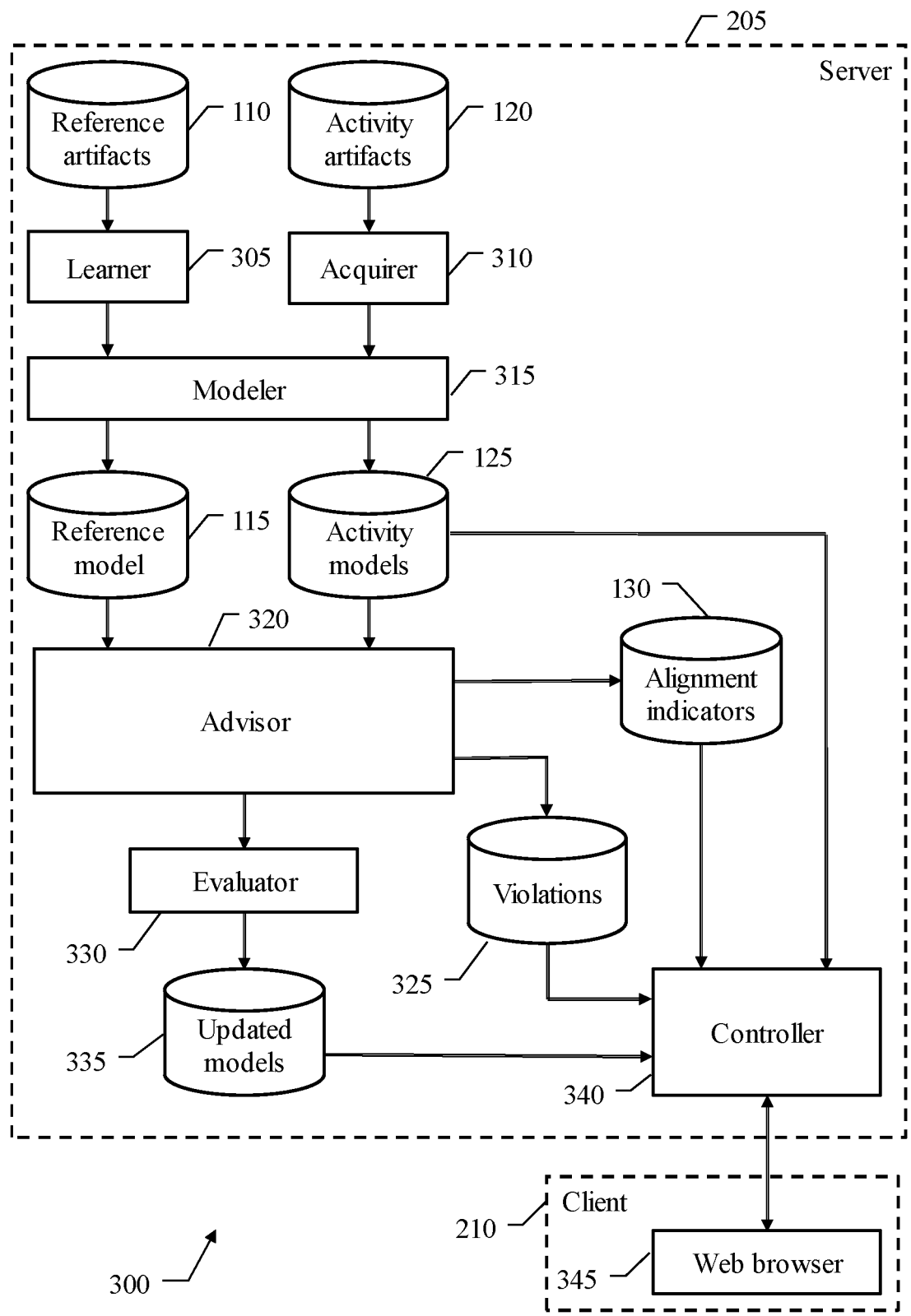
FIG. 3 illustrates main software components that may be used to implement the solution, according to an embodiment.

Referring to FIG. 3, a group of software components 300 is shown which may be used to implement the solution, according to an embodiment.

The group of software components 300 may include a program and data. The group of software components 300 may be stored in a mass memory and may be loaded (at least partially) into a working memory of a corresponding computing machine when the program is running. The program may initially be installed into the mass memory, for example, from a removable storage unit or from a network. There may be one or more programs. The program may be a module, a segment, or portion of code, and may include one or more executable instructions for implementing a specified logical function.

The group of software components 300 may include a server 205. The server 205 may include a learner 305. The learner 305 may retrieve one or more reference artifacts 110, which may be used to create a reference model 115. The learner 305 may access one or more repositories storing the one or more reference artifacts 110. The one or more reference artifacts 110 may include information from which the reference policies may be inferred. The one or more reference artifacts 110 may include compliant or new information technology solutions which are compliant with the reference policies of the company. The one or more reference artifacts 110 may include non-compliant or legacy information technology solutions which are non-compliant with the reference policies of the company.

The group of software components 300 may include an acquirer 310. The acquirer 310 may retrieve one or more activity artifacts 120 used to create one or more activity models 125. The acquirer 310 may accesses one or more repositories storing the one or more activity artifacts 120. The one or more activity artifacts 120 may include information relating to the activities that are to be performed onto the information technology systems, for example, in the context of projects that are in progress on the information technology systems. Examples of these activities include replacement/acquisition of hardware components, installation/upgrade of software programs and development/maintenance of software applications.

The one or more reference artifacts 110 and the one or more activity artifacts 120 may be stored either locally or remotely, in files, databases, wiki pages, or logs. The one or more reference artifacts 110 and the one or more activity artifacts 120 may include business and/or technical information. In an example, the one or more reference artifacts 110 may include strategic publications and communications of the company. In an example, the one ore more activity artifacts 120 may include project specifications and customer communications. Examples of the one or more reference artifacts 110 and the one or more activity artifacts 120 may include deal proposals, answers to tenders, business scenarios, and architectural specifications, such as blueprints, use cases, design diagrams, component diagrams, deployment diagrams, or operation diagrams. The one or more reference artifacts 110 and the one or more activity artifacts 120 may include documents, images, registrations either structured (for example, when written in a specification language) or unstructured (for example, when in the form of minutes, mails, chats).

The group of software components 300 may include a modeler 315. The learner 305 and the acquirer 310 may use the modeler 315 to create both the reference model 115 and the one or more activity models 125. The reference model 115 and the one or more activity models 125 may each be stored into a respective repository, which is accessed in write mode. The modeler 315 may be based on a cognitive engine, which may create the reference model 115 and the one or more activity models 125 by applying techniques that mimic operation of the human brain, such as based on image/speech recognition, natural language processing, machine learning and artificial intelligence. The reference model 115 and the one or more activity models 125 may be defined in terms of a corresponding mathematical model. The corresponding mathematical model may conform to a common formalism, and the one or more activity models 126 may include a description in natural language of its activity and an identifier of the corresponding customer. The reference model 115 may include one or more compliance signatures and one or more non-compliance signatures, which provide a formal representation of the compliant information technology solutions and of the non-compliant information technology solutions, respectively.

The one or more activity models 125 may each include an activity signature that provides a formal representation of the corresponding activity. Each (compliance, non-compliance and activity) signature may be defined by a tuple of sets, with each set that in turn is defined by a tuple of one or more elements. In an example, the signature may include four sets, the four sets may respectively include context, entities, relationships and keywords. The set for the context may include a variable that represents a context of the corresponding information technology solution, for example, for the reference model 115; or of the corresponding project, for example, for the one or more activity models 125, an industry of applicability (such as banking, retail, customer support), a region/nation. The set for the entities may include one or more variables that represent corresponding entities of the information technology solution or project, for example, use cases (like withdrawal, payments, reporting, access), components (like user interface, transaction system, ticketing system) and technology stacks (like processors, disks, operating systems, DBMSs, cloud platforms). The set for the relationships may include one or more operators that represent corresponding relationships among the entities, for example, realize, access, support, implement, use. The set for the keywords comprises one or more variables that indicate corresponding keywords characterizing the information technology solution or project, for example, "smartphone" and "marketplace".

In an embodiment, the reference model 115 (Mr) may be defined by its compliance signatures $Sc_i$ (with i=1 ... N) and its non-compliance signatures $Sn_j$ (with j=1 ... M) as Mr= $\{..., Sn_i, ...\},\{..., Sn_j, ...\}$, whereas each activity model of the one or more activities models 125 (Ma) may be defined by a corresponding activity signature (Sa). In turn (if k is a generic index for the entities, the relationships and the keywords), defining $Cc_i$ as the context, $Ec_{ik}$ as the entities, $Rc_{ik}$ as the relationships and $Kc_{ik}$ as the keywords of each compliance signature $Ss_i$ the compliance signatures, $Sc_i$ (with i=1 . . . N), may be defined as:

$$Sc_i = \{Cc_i, \{ \ldots, Ec_{ik}, \ldots \}, \{ \ldots, Rc_{ik}, \ldots \}, \{ \ldots, Kc_{ik}, \ldots \}\}.$$

Additionally, defining $Cn_j$ as the context, $En_{jk}$ as the entities, $Rn_{jk}$ as the relationships and $Kn_{jk}$ as the keywords of each non-compliance signature $Sn_j$, the non-compliance signatures $Sn_j$ may be defined as:

$$Sn_j = \{Cn_j, \{ \ldots, En_{jk}, \ldots \}, \{ \ldots, Rn_{jk}, \ldots \}, \{ \ldots, Kn_{jk}, \ldots \}\}.$$

Furthermore, defining Ca as the context, $Ea_k$ as the entities, $Ra_k$ as the relationships and $Ka_k$ as the keywords of each activity signature Sa, the activity signature Sa may be defined as:

$$Sa = \{Ca, \{ \ldots, Ea_k, \ldots \}, \{ \ldots, Ra_k, \ldots \}, \{ \ldots, Ka_k, \ldots \}\}.$$

Moreover, the reference model 115 may further be defined by corresponding relevance weights $Wce_k$, $Wcr_k$ and $Wck_k$ for the entities $Ec_{jk}$, the relationships $Rc_{jk}$ and the keywords $Kc_{jk}$, respectively, of the compliance signatures $Sc_j$, and by corresponding relevance weights $Wne_k$, $Wnr_k$ and $Wnk_k$ for the entities $En_{jk}$, the relationships $Rn_{jk}$ and the keywords $Kn_{jk}$, respectively, of the non-compliance signatures $Sn_1$. The relevance weights $Wce_k$, $Wcr_k$, $Wck_k$, $Wne_k$, $Wnr_k$ and $Wnk_k$ may measure a relevance of the corresponding elements to provide the formal representation of their (compliant and non-compliant) information technology solution (for example, from 0 to 1 in increasing order of relevance). Each activity model of the one or more activities models 125 may further be defined by corresponding confidence factors $Fe_k$, $Fr_k$ and $Fk_k$ for the entities $Ea_k$, the relationships $Ra_k$ and the keywords $Ka_k$, respectively, of the activity signature Sa. The confidence factors $Fe_k$, $Fr_k$ and $Fk_k$ may measure a confidence of the corresponding elements to provide the formal representation of the activity (for example, again from 0 to 1 in increasing order of confidence).

The group of software components 300 may include an advisor 320. The advisor 320 may access (in read mode) the reference model 115 and the one or more activity models 125 to calculate one or more alignment indicators 130, which may be stored into a corresponding repository (accessed in write mode). Each of the one or more alignment indicators 130 may include a numerical value (referred to as numerical alignment indicator) measuring an alignment of the corresponding activity with the reference policies (for example, from 0 to 1 in increasing order of alignment). Each of the one or more the alignment indicators 130 may include a binary value (referred to as binary alignment indicator) that may have an enabling value (like GO) to indicate that the execution of the corresponding (aligned) activity is enabled since it is sufficiently aligned with the reference policies or a preventing value (like NO-GO) to indicate that the execution of the corresponding (non-aligned) activity is prevented since it is not sufficiently aligned with the reference policies. Moreover, the advisor 320 may determine one or more violations 325 of the relevance policies by each activity; the one or more violations 325 may be defined by (non-aligned) elements, i.e., entities, relationships and keywords, of the corresponding activity model of the one or more activity models 125 that are not aligned with the reference policies (in addition to a description in natural language thereof). The advisor 320 may store the one or more violations 325, denoted with reference to the one or more violations 325, into a corresponding repository (accessed in write mode). The advisor 320 may further interact with an evaluator 330. The evaluator 330 may determine an update of an activity model of each non-aligned activity; the resulting (updated) activity model of the one or more activity models 125 may define an update of the corresponding activity aimed at remediating its non-alignment with the reference polices, i.e., for making the corresponding (updated) activity aligned therewith. The updated activity model of the one or more activity models 125 may be represented as above by a corresponding (updated) signature with its context, entities, relationships and keywords (in addition to a description in natural language thereof, and particularly of its update with respect to the corresponding activity). The evaluator 330 may store one or more updated activity models 335, of the one or more activity models 125, into a corresponding repository (accessed in write mode).

The group of software components 300 may include a controller 340. The controller 340 may accesses (in read mode) the one or more activity models 125, the one or more alignment indicators 130, the one or more violations 325, and the one or more updated activity models 335 for outputting information used to manage the information technology systems accordingly. For this purpose, the controller 340 may have a user interface that allows a user (i.e., the employees and the executive of the company) to submit corresponding requests.

A client 210 may interface with the group of software components 300. The client may include more than one user. The user may use a web browser 345 to surf the Internet. The web browser 345 may be used to access the controller 340 of the server 205 for managing the information technology systems.

Figure 4A:
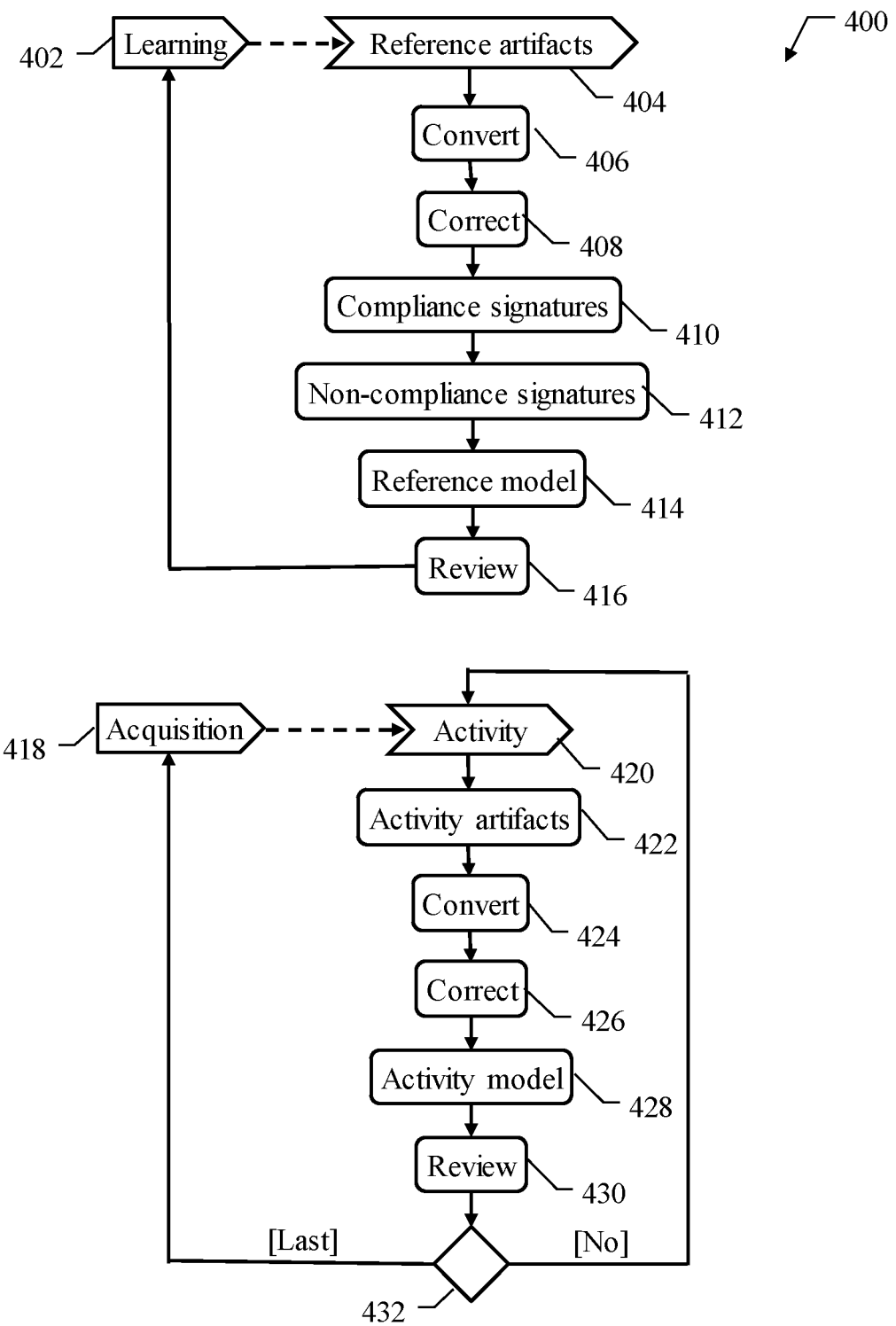
FIGS. 4A and 4B illustrate an activity diagram describing a flow of activities relating to an implementation of the solution, according to an embodiment.
Figure 4B:
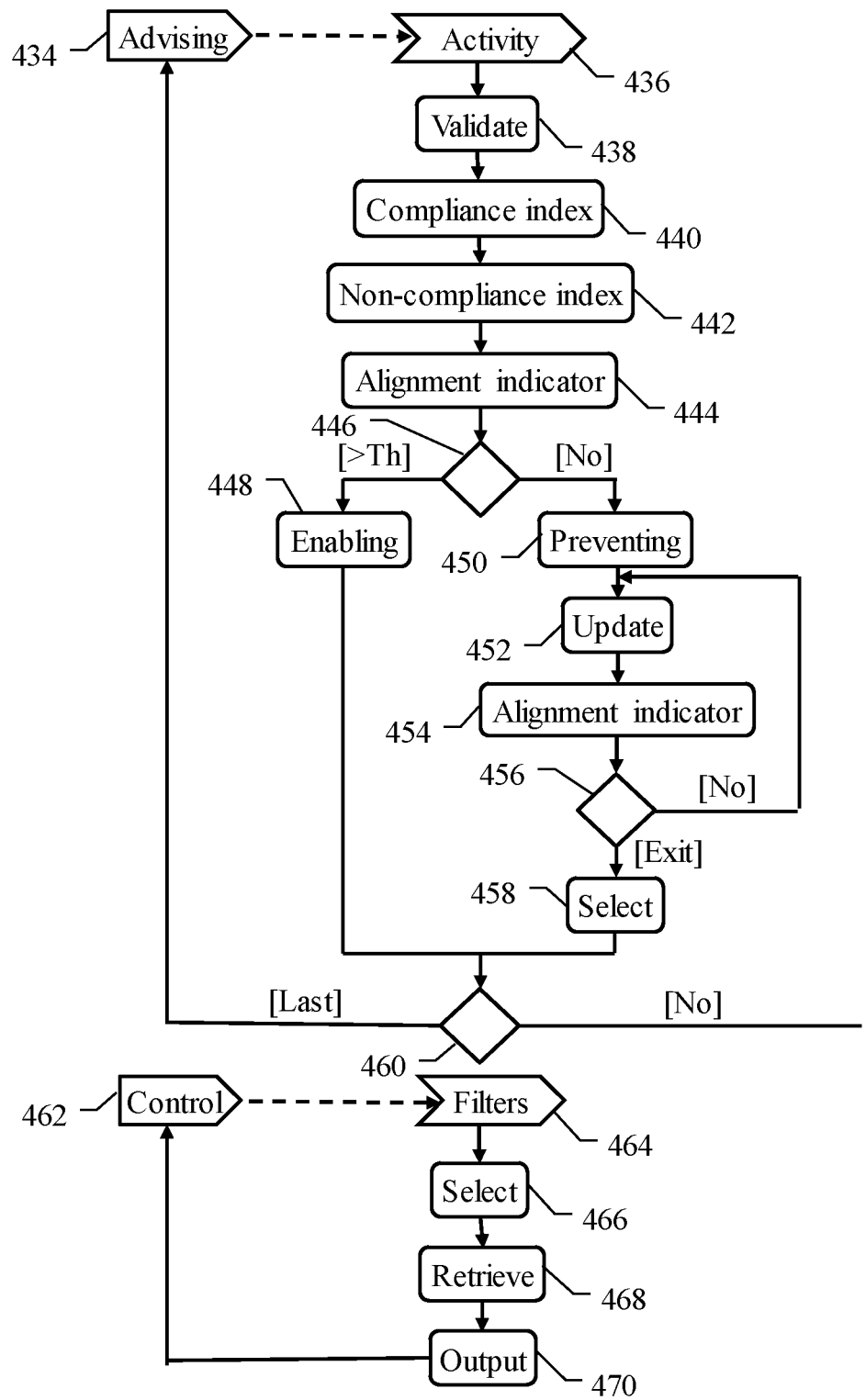

Referring to FIGS. 4A and 4B, activity diagrams are shown describing a flow of activities relating to an implementation of a solution, according to an embodiment.

FIGS. 4A and 4B represents an exemplary process that may be used to manage the information technology systems with a method 400. Each block of the figures may correspond to one or more executable instructions for implementing the specified logical function on the server.

The process may pass from block 402 to block 404 when as an event triggering the start of a learning phase occurs (for example, at the expiration of a learning period, such as every week, or upon a manual request, such has due to a major change in the strategy of the company). In response, the learner 305 may retrieve the one or more reference artifacts 110; for this purpose, the learner 305 may leverage local/remote repositories and sensors (for example, installed on the clients). Continuing to block 406, the learner 305 may convert the one or more reference artifacts 110 into a (normalized) format suitable for their next processing by the modeler; for this purpose, the learner 305 may leverage search engines, chat bots and speech-to-text converters to extract relevant information from the one or more reference artifacts 110 that are unstructured. The learner 305 continuing at block 408 may corrects the (normalized) one or more reference artifacts 110, for example, by solving ambiguities that might lead to misleading representations in the reference model 115; for this purpose, the learner 305 may apply machine learning algorithms to correct the one or more reference artifacts 110 automatically, or it may require human interventions (for example, by specialized operators of the company) to correct the one or more reference artifacts 110 manually (at the same time training the machine learning algorithms accordingly to avoid their intervention in the future for similar situations).

The modeler 315 may continue at block 410 to determine compliant information technology solutions and then create corresponding compliance signatures (according to the corresponding one or more reference artifacts 110); particularly, for each compliant information technology solution the modeler determines its context, entities, relationships and keywords, and the corresponding relevance weights. Likewise, the modeler 315 continues at block 412 and may determine non-compliant information technology solutions and then create non-compliance signatures (according to the corresponding one or more reference artifacts 110); in this case as well, for each non-compliant information technology solution the modeler determines its context, entities, relationships and keywords, and the corresponding relevance weights. The modeler 315 at block 414 may create the reference model 115 as the combination of the compliance signatures and non-compliance signatures, with the addition of the relevance weights of their elements, i.e., entities, relationships and keywords. The learner 305 at block 416 may also review the reference model 115, for example, by applying machine learning algorithms or requiring human interventions by the specialized operators as above to improve a quality of the reference model 115 (if necessary). The modeler may save the resulting reference model 115 into a corresponding repository. The process then returns to the block 402 waiting for a further triggering of the learning phase.

Independently, the process may pass from block 418 to block 420 when an event triggering the start of an acquisition phase occurs (for example, at the expiration of an acquisition period, generally shorter than the learning period, such as every day, or upon a manual request, such has due to the reaching of a milestone in any project); in response thereto, a loop is entered for processing the activities that are impacted by the event, all or only a part thereof (starting from a first one in any arbitrary order). Next, the acquirer 310 at block 422 may determine the one or more activity artifacts 120 of the (current) activity and retrieve them. Continuing to block 424, the acquirer 310 may convert the one or more activity artifacts 120 into a (normalized) format suitable for their next processing by the modeler 315 as above. Then, the acquirer 310 at block 426 may corrects the (normalized) one or more activity artifacts 120, as described above. The modeler 315 continues, and at block 428 may create the activity signature of the one or more activity models 125, according to the corresponding one or more activity artifacts 120; particularly, the modeler 315 may determine its context, entities, relationships and keywords, and the corresponding confidence factor. Next, the acquirer 310 at block 430 may review the one or more activity models 125, for example, for each element, i.e., entities, relationships and keywords, having the confidence factor that is (possibly strictly) lower than a confidence threshold (THc) providing an acceptable degree of confidence (such as 0.2-0.4); indeed, it is likely that these elements have not been correctly identified, so that machine learning algorithms or human interventions by the specialized operators as above may be used to improve a quality of the activity model. The modeler 315 may determine the description of the activity and the identifier of its customer; the modeler 315 may save the resulting one or more activity models 125 into a corresponding repository. Next, a test may be made at block 432, wherein the acquirer 310 verifies whether a last (impacted) activity has been processed. If not, the flow of activity returns to the 420 to repeat the same operations for a next impacted activity. Conversely (once all the impacted activities have been processed), the loop may be exited by returning to the block 418 waiting for a further triggering of the acquisition phase.

Independently, the process may pass from block 434 to block 436 when an event triggering the start of an advising phase occurs (for example, after any acquisition phase or upon any access to the controller); in response thereto, a loop is entered for processing the activities that are impacted by the event, all or only a part thereof (starting from a first one in any arbitrary order). Next, the advisor 320 at block 438 may validate the one or more activity models 125 of the (current) activity; if the one or more activity models 125 has any element, i.e., entities, relationships and keywords, with the confidence factor that is (possibly strictly) lower than the confidence threshold, the advisor 320 may review them as described in the acquisition phase. Then, the advisor 320 at block 440 may calculate a compliance index of the activity (measuring its compliance with the reference policies). The advisor may determine the compliance signatures $Sc_i$ (of the reference model Mr) whose context $Cc_i$ is the same as the context Ca of the corresponding activity signature Sa; the advisor 320 may determine the other (aligned) elements, i.e., the entities $Ea_k$, the relationships $Ra_k$ and the keywords $Ka_k$, of the activity signature Sa that are included in any of these compliance signatures $Sc_i$. The compliance index (k) may be set to the sum of the confidence factors $Fe_k$, $Fr_k$ and $Fk_k$ for the aligned elements $Ea_k$, $Ra_k$ and $Ka_k$, respectively, multiplied by the relevance weights $Wce_k$, $Wcr_k$ and $Wck_k$ for the corresponding elements $Ec_{jk}$, $Rc_{jk}$ and $Kc_{jk}$, respectively, of the compliance signatures $Sc_i$, normalized to a total number (TOT) of the elements $Ea_k$, $Ra_k$ and $Ka_k$ of the activity signature Sa:

$$Ic=(\Sigma_k Fe_k \cdot Wce_k + Fr_k \cdot Wcr_k + Fk_k \cdot Wck_k)/TOT.$$

Continuing, the advisor 320 at block 442 may calculate a non-compliance index of the activity (measuring its non-compliance with the reference policies). For this purpose, the advisor 320 may determine the non-compliance signatures $Sn_i$ (of the reference model Mr) whose context $Cn_i$ is the same as the context Ca of the activity signature Sa; the advisor 320 may then determine the other (non-aligned) elements, i.e., the entities $Ea_k$, the relationships $Ra_k$ and the keywords $Ka_k$, of the activity signature Sa that are comprised in any of these non-compliance signatures $Sn_i$. The non-compliance index (In) may be set to the sum of the confidence factors $Fe_k$, $Fr_k$ and $Fk_k$ for the non-aligned elements $Ea_k$, $Ra_k$ and $Ka_k$, respectively, multiplied by the relevance weights $Wne_k$, $Wnr_k$ and $Wnk_k$ for the corresponding elements $En_{jk}$, $Rn_{jk}$ and $Kn_{jk}$, respectively, of the non-compliance signatures $Sn_i$, normalized to the total number TOT of the elements $Ea_k$, $Ra_k$ and $Ka_k$ of the activity signature Sa:

$$In=(\Sigma_k Fe_k \cdot Wne_k + Fr_k \cdot Wnr_k + Fk_k \cdot Wnk_k)/TOT.$$

The advisor 320 may continue to block 444 and may calculates the numerical alignment indicator (Ia) of the activity as the ratio of the compliance index Ic with respect to the sum of the compliance index Ic and the non-compliance index In:

$$Ia = \frac{Ic}{Ic + In}.$$

Next, the flow of activity may branch at block 446 according to a comparison of the numerical alignment indicator with an alignment threshold (THa) providing an acceptable degree of alignment with the reference policies (such as 0.6-0.8). If the numerical alignment indicator is (possibly strictly) higher than an alignment threshold (meaning that the activity is sufficiently aligned with the reference policies), the advisor 320 at block 448 may set the binary alignment indicator of the activity to the enabling value (GO); the advisor then saves the alignment indicator of the (aligned) activity, defined by the numerical alignment indicator and the binary alignment indicator, and any violations of the reference policies by the activity, defined by the non-aligned elements $Ea_k$, $Ra_k$ and $Ka_k$ of the activity model with their description, into the corresponding repository.

Referring back to the block 446, if instead the numerical alignment indicator is (possibly strictly) lower than the alignment threshold (meaning that the activity is not sufficiently aligned with the reference policies), the advisor 320 at block 450 sets the binary alignment indicator of the activity to the preventing value (NO-GO); the advisor 320 may then save the alignment indicator of the (non-aligned) activity, defined by the numerical alignment indicator and the binary alignment indicator, and the violations of the reference policies by the activity, defined by the non-aligned elements $Ea_k$, $Ra_k$ and $Ka_k$ of the activity model with their description, into the corresponding repository. At this point, a loop is entered in an attempt to determine the updated activity one or more activity models 125 (for remediating its non-alignment with the reference policies). The loop begins at block 452, wherein the evaluator 330 determines a (candidate) update of the one or more activity models 125; the resulting (candidate) one or more activity models 125 is defined by replacing one or more sub-trees formed by non-aligned entities and relationships of the one or more activity models 125 with corresponding sub-trees formed by similar entities and relationships of the compliance signatures of the reference model 115 (in increasing order of complexity of these sub-trees, from single non-aligned entities to all the non-aligned entities and relationships). Then, the evaluator 330 at block 454 may calculate the alignment indicator of the candidate activity model, as described above. Next, a test may be done at block 456, wherein the evaluator 330 verifies whether an exit condition of the loop is satisfied. If not, for example, when the binary alignment indicator of the candidate activity model is still equal to the preventing value (meaning that the candidate activity model of the one or more activity models 125 is not capable of making the activity aligned with the reference policies) and further candidate updates of the one or more activity models 125 are possible, the flow of activity returns to block 452 to repeat the same operations for a next candidate update of the one or more activity models 125. Conversely, for example, when the binary alignment indicator of the candidate activity model has become equal to the enabling value (meaning that the candidate activity model is capable of making the activity aligned with the reference policies) or in any case after all the possible candidate updates of the activity model have been taken into account, the loop is exit by descending into block 458; at this point, the evaluator selects the candidate activity model of the one or more activity models 125 providing the best improvement of the numerical alignment indicator (simply the last candidate activity model when the numerical alignment indicator has become equal to the enabling value) as the updated activity model of the one or more activity models 125, and saves it (together with its description) into a corresponding repository.

The flow of activity merges again at block 460 from the block 448 or from the block 458; at this point, the advisor verifies whether a last (impacted) activity has been processed. If not, the flow of activity returns to the 436 to repeat the same operations for a next impacted activity. Conversely (once all the impacted activities have been processed), the loop is exit by returning to the block 434 waiting for a further triggering of the advising phase.

Independently, the process passes from block 462 to block 464 when as an event triggering the start of a control phase occurs (for example, automatically after any advising phase or whenever a user, i.e., any employee or executive of the company, accesses the controller with the web browser of his/her client). At block 464, one or more filtering criteria for selecting the activities (whose information is to be output) may be determined. The control phase may be started automatically when the controller 340 directly retrieves filtering criteria according to a corresponding configuration parameter of the advisor 320; for example, in this case the filtering criteria may be for selecting all the activities indiscriminately or only the ones whose alignment indicators have changed significantly, such as when a variation of their numerical alignment indicators is (possibly strictly) higher than a variation threshold (like 10-20%) or their binary alignment indicators have switched between the enabling value and the preventing value. Conversely, when the controller 340 has been accessed by a user, the filtering criteria are entered manually onto the web browser 345 (according to the description of the activities and the identifiers of the customers retrieved from the activity models); particularly, each employee may select any of the activities under his/her responsibility (i.e., activities to be executed by the employee or by a group of employees managed by him/her), from a single one to all of them, whereas each executive may select any activities and/or customers under his/her responsibility (up to all). Next, the controller 340 at block 466 may select the activities according to the filtering criteria. Then, the controller 340 at block 468 may retrieve information relating to the (selected) activities. Particularly, for each selected activity the controller 340 may retrieve its description and the identifier of its customer (from the corresponding activity model of the one or more activity models 125), its alignment indicator and the description of the possible violations (from the corresponding repositories); moreover, if the binary alignment indicator of the selected activity is equal to the preventing value, the controller further may retrieve the description of its updated activity model of the one or more activity models 125, i.e., of the updates to be applied to the selected activity to improve its alignment with the reference policies. Next, the controller at block 470 may cause the output of the information so determined for the selected activities into a format for viewing by the client, for example, onto a computer monitor. The process may then return to the block 462, waiting for a further triggering of the control phase.

In this way, each employee may track the alignment of his/her activities with the reference policies; likewise, each executive may obtain a comprehensive report about the activities of any employees and/or with any customers. In both cases, the binary alignment indicators may provide an overview of the activities, which may be used to readily identify any required interventions (for example, for stopping activities, allocating other employees with better fitting skills). Moreover, the numerical alignment indicators provide a quantitative evaluation of the activities, which may be used to score the activities (for example, for prioritizing the interventions thereon). The violations identify the points requiring an intervention, which may be used to decide how to act (for example, for updating the structures of the information technology systems). The updates to the non-aligned activities suggest potentially better options, which may be used to facilitate the above-mentioned decisions. In any case, this allows acting either in a remediation way (by correcting activities that are in progress) or in a proactive way (by correcting activities that are only planned). Moreover, the obtained information may be simply used by the employees/executives to drive their behaviors. However, it is also possible to act onto the information technology systems directly; for example, the controller may enforce aligned activities (such as by creating/updating/deleting virtual machines, installing/patching/removing software programs) and it may block non-compliant activities (such as by denying corresponding authorizations).

Naturally, in order to satisfy local and specific requirements, a person skilled in the art may apply many logical and/or physical modifications and alterations to the present disclosure. More specifically, although this disclosure has been described with a certain degree of particularity with reference to one or more embodiments thereof, it should be understood that various omissions, substitutions and changes in the form and details as well as other embodiments are possible. Particularly, different embodiments of the present disclosure may be practiced without the specific details (such as the numerical values) set forth in the preceding description to provide a more thorough understanding thereof; conversely, well-known features may have been omitted or simplified in order not to obscure the description with unnecessary particulars. Moreover, it is expressly intended that specific elements and/or method steps described in connection with an embodiment of the present disclosure may be incorporated in another embodiment as a matter of general design choice. In any case, each numerical value should be read as modified by the term about (unless already done) and each range of numerical values should be intended as expressly specifying any possible number along the continuum within the range (comprising its end points). Moreover, ordinal or other qualifiers are merely used as labels to distinguish elements with the same name but do not by themselves connote any priority, precedence or order. The terms include, comprise, have, contain and involve (and any forms thereof) should be intended with an open, non-exhaustive meaning (i.e., not limited to the recited items), the terms based on, dependent on, according to, function of (and any forms thereof) should be intended as a non-exclusive relationship (i.e., with possible further variables involved), the term a/an should be intended as one or more items (unless expressly indicated otherwise), and the term means for (or any means-plus-function formulation) should be intended as any structure adapted or configured for carrying out the relevant function.

For example, an embodiment provides a method for managing one or more industrial products. However, the industrial products may be in any number and of any type (for example, information technology systems such as data centers, networks, software applications, or more generally plants, machines, services and the like).

In an embodiment, the method comprises the following steps that are performed under the control of a computing system. However, the computing system may be of any type (see below).

In an embodiment, the method comprises retrieving by the computing system one or more reference artifacts. However, the reference artifacts may be in any number and of any type (for example, partial, different and/or additional artifacts with respect to the ones mentioned above), and they may be retrieved, for example, by reading files, submitting queries, interrogating sensors, downloading pages and the like.

In an embodiment, the reference artifacts are indicative of one or more reference policies of an entity associated with the industrial products. However, the reference artifacts may relate to the reference policies in any way (for example, dedicated, tagged, inferred ones and the like); moreover, the reference policies may be in any number and of any type (for example, defining strategies, short-term goals, contingent needs and the like).

In an embodiment, the reference artifacts are retrieved from a memory of the computing system. However, the reference artifacts may be stored in any way (for example, locally and/or remotely).

In an embodiment, the method comprises creating by the computing system a reference model providing a formal representation of the reference policies. However, the reference model may be of any type (for example, mathematical, logical, statistical one and the like, with separate part for the compliancy and the non-compliancy with the reference policies or all together) and it may be based on any formalism (for example, entity-relationship, data flow, state transition and the like).

In an embodiment, the reference model is created according to the reference artifacts. However, the reference model may be created in any way (for example, with cognitive, artificial intelligence, fuzzy logic techniques and the like).

In an embodiment, the method comprises retrieving by the computing system one or more activity artifacts. However, the activity artifacts may be in any number and of any type, and they may be retrieved in any way (either the same or different with respect to the reference artifacts).

In an embodiment, the activity artifacts are indicative of one or more activities to be performed on the industrial products. However, the activity artifacts may relate to the activities in any way (either the same or different with respect to the reference artifacts) and the activities may be in any number and of any type (for example, partial, different and/or additional activities with respect to the ones mentioned above for the information technology systems, or more generally for adding/updating/replacing components and/or functionalities of industrial products); moreover, the activities may be still to start, in progress or even already completed.

In an embodiment, the activity artifacts are retrieved from the memory of the computing system. However, the activity artifacts may be stored in any way (either the same or different with respect to the reference artifacts).

In an embodiment, the method comprises creating by the computing system corresponding activity models providing a formal representation of the activities. However, the activities models may be in any number and of any type, and they may be based on any formalism (either the same or different with respect to the reference model).

In an embodiment, the activity models are created according to the corresponding activity artifacts. However, the activity models may be created in any way (either the same or different with respect to the reference model).

In an embodiment, the method comprises calculating by the computing system corresponding alignment indicators indicative of an alignment of the activities with the reference policies. However, the alignment indicators may be of any type (for example, qualitative and/or quantitative indicators, with or without additional information like violations for all the activities or only for the non-aligned ones).

In an embodiment, the alignment indicators are calculated according to a comparison between the corresponding activity models and the reference model. However, the alignment indicators may be calculated in any way (for example, with mathematical, statistical, inference techniques and the like).

In an embodiment, the method comprises outputting by the computing system an indication of the alignment indicators. However, the alignment indicators may be output in any way (for example, displayed, printed or sent to any users, submitted or passed to other computing systems) for providing any indication thereof (for example, in human-readable and/or machine-readable form).

In an embodiment, the indication of the alignment indicators is output for managing the industrial products by controlling an execution of the activities according to the corresponding alignment indicators. However, the execution of the activities may be controlled in any way (for example, manually, automatically or any combination thereof).

In an embodiment, the method comprises creating by the computing system the reference model comprising one or more compliance signatures. However, the compliance signatures may be in any number and of any type (for example, based on variable, operators, parameters or any combination thereof).

In an embodiment, the compliance signatures provide a formal representation of corresponding industrial solutions that are compliant with the reference policies. However, the compliant industrial solutions may be in any number and of any type (for example, industrial products already implemented and/or approved by the entity, described in reference publications and the like), and they may be determined in any way (for example, automatically and/or manually).

In an embodiment, the method comprises creating by the computing system the reference model comprising one or more non-compliance signatures. However, the non-compliance signatures may be in any number and of any type (either the same or different with respect to the compliance signatures).

In an embodiment, the non-compliance signatures provide a formal representation of corresponding industrial solutions that are not compliant with the reference policies. However, the non-compliant industrial solutions may be in any number and of any type, and they may be determined in any way (either the same or different with respect to the compliant industrial solutions).

In an embodiment, the compliance signatures and the non-compliance signatures conform to a common formalism. However, the common formalism may be of any type (for example, based on linear/non-linear, discrete/continuous, deterministic/probabilistic formulas and/or propositions, and the like).

In an embodiment, the method comprises creating by the computing system the activity models comprising corresponding activity signatures conforming to the common formalism. However, the activity signatures may be in any number and of any type (either the same or different with respect to the compliance/non-compliance signatures).

In an embodiment, the compliance signatures, the non-compliance signatures and the activity signatures each comprises one or more sets, with each set of one or more elements. However, each signature may comprise any number and type of sets, each one having any number and type of elements (for example, partial, different and/or additional sets and/or elements with respect to the ones mentioned above).

In an embodiment, the method comprises calculating by the computing system corresponding compliance indexes indicative of a compliance of the activities with the reference policies. However, the compliance indexes may be of any type (for example, quantitative, qualitative, continuous, discrete ones or any combination thereof).

In an embodiment, each compliance index is calculated according to the elements of the corresponding activity signature that match the elements of the compliance signatures. However, the matching elements may be determined in any way (for example, when any element of the activity signature is comprised at least in any predefined number of the compliance signatures) and they may be used to calculate the compliance index in any way (for example, according to properties thereof, their number and the like); in any case, the possibility of calculating the compliance indexes in a different way is feasible (for example, based on cognitive, artificial intelligence, fuzzy logic techniques or the like).

In an embodiment, the method comprises calculating by the computing system corresponding non-compliance indexes indicative of a non-compliance of the activities with the reference policies. However, the non-compliance indexes may be of any type (either the same or different with respect to the compliance indexes).

In an embodiment, each non-compliance index is calculated according to the elements of the corresponding activity signature that match the elements of the non-compliance signatures. However, the matching elements may be determined in any way and they may be used to calculate the non-compliance index in any way (either the same or different with respect to the compliance indexes); in any case, the possibility of calculating the non-compliance indexes in a different way is feasible (either in the same or different way with respect to the compliance indexes).

In an embodiment, the method comprises calculating by the computing system the alignment indicators according to the corresponding compliance indexes and non-compliance indexes. However, each alignment indicator may be calculated in any way (for example, by any linear or non-linear combination of the compliance index and the non-compliance index); in any case, the possibility of calculating the alignment indicators directly (without calculating any compliance and non-compliance indexes) is not excluded.

In an embodiment, the compliance signatures, the non-compliance signatures and the activity signatures each comprises one of the sets that comprises one of the elements for a context. However, the context may be defined with any number and type of elements (for example, different and/or additional elements with respect to the ones mentioned above).

In an embodiment, the compliance signatures, the non-compliance signatures and the activity signatures each comprises one of the sets that comprises one or more of the elements for corresponding entities. However, the entities may be defined with any number and type of elements (for example, partial, different and/or additional elements with respect to the ones mentioned above).

In an embodiment, the compliance signatures, the non-compliance signatures and the activity signatures each comprises one of the sets that comprises one or more of the elements for corresponding relationships among the entities. However, the relationships may be defined with any number and type of elements (for example, partial, different and/or additional elements with respect to the ones mentioned above).

In an embodiment, the compliance signatures, the non-compliance signatures and the activity signatures each comprises one of the sets that comprises one or more of the elements for corresponding keywords. However, the keywords may be defined with any number and type of elements (for example, partial, different and/or additional elements with respect to the ones mentioned above).

In an embodiment, the method comprises outputting by the computing system an indication of the elements of the activity signature of each of the activities that match the elements of the non-compliance signatures. However, these (non-aligned) elements may be output in any way for providing any indication thereof (see above) or this feature may be omitted at all.

In an embodiment, these elements are output for managing the industrial products according thereto. However, the industrial products may be managed accordingly in any way (see above).

In an embodiment, the method comprises determining by the computing system the activity models comprising corresponding confidence factors for the elements thereof. However, the confidence factors may be determined in any way (for example, automatically and/or manually) or they may be omitted at all.

In an embodiment, each of the confidence factor measures a confidence of the corresponding element to provide the formal representation of the corresponding activity. However, the confidence factors may be of any type (for example, quantitative, qualitative, continuous, discrete ones or any combination thereof).

In an embodiment, the method comprises calculating by the computing system the compliance indexes each according to the confidence factors of the elements of the corresponding activity signature that match the elements of the compliance signatures. However, the confidence factors may be used to calculate the compliance index in any way (for example, according to any linear/non-linear combination thereof).

In an embodiment, the method comprises calculating by the computing system the non-compliance indexes each according to the confidence factors of the elements of the corresponding activity signature that match the elements of the non-compliance signatures. However, the confidence factors may be used to calculate the compliance index in any way (either the same or different with respect to the non-compliance index).

In an embodiment, the method comprises correcting by the computing system the activity models for each of the elements having the corresponding confidence factor not reaching a confidence threshold. However, the activity models to be corrected may be determined according to any comparison (for example, taking into account a tolerance margin based on an average accuracy of all the activity models) with any confidence threshold (for example, static or dynamic one), and the activity models may be corrected in any way (for example, with cognitive, artificial intelligence, fuzzy logic techniques and the like, automatically and/or manually); in any case, the same feature may also be applied to the reference model or it may be omitted at all.

In an embodiment, the method comprises creating by the computing system the reference model comprising corresponding relevance weights for the elements thereof. However, the relevance weights may be determined in any way (for example, automatically and/or manually) or they may be omitted at all.

In an embodiment, each of the relevance weights measures a relevance of the corresponding element to provide the formal representation of the corresponding industrial solution. However, the relevance weights may be of any type (for example, quantitative, qualitative, continuous, discrete ones or any combination thereof).

In an embodiment, the method comprises calculating by the computing system the compliance indexes each according to the elements of the corresponding activity signature that match the elements of the compliance signatures weighted according to the corresponding relevance weights. However, the relevance weights may be used to calculate the compliance index in any way (for example, according to any linear/non-linear combination based thereon), down to none.

In an embodiment, the method comprises calculating by the computing system the non-compliance indexes each according to the elements of the corresponding activity signature that match the elements of the non-compliance signatures weighted according to the corresponding relevance weights. However, the relevance weights may be used to calculate the non-compliance index in any way (either the same or different with respect to the compliance indexes), down to none.

In an embodiment, the method comprises setting by the computing system the alignment indicators each to an enabling value for enabling the execution of the corresponding activity or to a preventing value for preventing the execution of the corresponding activity. However, the enabling/preventing values may be of any type (for example, indications for humans, commands for machines, and the like).

In an embodiment, each alignment indicator is set according to a comparison of the alignment indicator with an alignment threshold. However, the alignment indicator may be set according to any comparison (for example, switching its value only after two or more consecutives verifications thereof) with any alignment threshold (for example, static or dynamic one).

In an embodiment, the method comprises determining by the computing system an update of non-aligned one or more of the activities (which have the corresponding alignment indicators equal to the preventing value) into corresponding updated activities. However, the updates may be defined in any way (for example, in terms of the activity models or directly in terms of the activities), for any number of non-aligned activities (for example, all or only the ones whose alignment indicators reach an update threshold) and in any number (one or more) for each of them; in any case, the same feature may be applied to all the activities or it may be omitted at all.

In an embodiment, the update of the non-aligned activities is determined according to a comparison between the corresponding activity models and the reference model. However, the updates may be determined in any way (for example, with try-and-error, analytic techniques and the like).

In an embodiment, the method comprises outputting by the computing system an indication of the updated activities. However, the updated activities may be output in any way for providing any indication thereof (see above) or this feature may be omitted at all.

In an embodiment, the updated activities are output for managing the industrial products according thereto. However, the industrial products may be managed accordingly in any way (see above).

In an embodiment, for each of the non-aligned activities the method comprises determining by the computing system one or more candidate updates of the activity model of the non-aligned activity into corresponding candidate activity models according to a comparison between the activity model of the non-aligned activity and the reference model. However, the candidate updates may be determined in any number and in any way (for example, by replacing partial, different and/or additional elements with respect to the ones mentioned above).

In an embodiment, for each of the non-aligned activities the method comprises calculating by the computing system corresponding candidate alignment indicators of the candidate activity models each according to a comparison between the corresponding candidate activity model and the reference model. However, the candidate alignment indicators may be of any type and may be calculated in any way (either the same or different with respect to the alignment indicators).

In an embodiment, for each of the non-aligned activities the method comprises selecting by the computing system an updated activity model among the candidate activity models according to the corresponding candidate alignment indicators. However, the updated activity model may be selected in any way (for example, the first one making the activity aligned with the reference policies or the one providing the best alignment with the reference policies).

In an embodiment, for each of the non-aligned activities the method comprises determining by the computing system the updated activity according to the updated activity model. However, the updated activity may be determined in any way (for example, with cognitive, artificial intelligence, fuzzy logic techniques and the like).

In an embodiment, each of the activities is associated with one or more subjects for executing the activity. However, the subjects may be in any number and of any type (for example, employees, external consultants, suppliers).

In an embodiment, the method comprises outputting by the computing system the indication of one or more of the alignment indicators selected according to the corresponding subjects and/or industrial products. However, the information to be output may be selected in any way (for example, automatically for pre-defined reports and/or manually in any user interface, according to the subjects, the industrial products, other criteria like customers, regions/nations, periods or any combination thereof).

In an embodiment, the method comprises controlling the execution of the activities according to the corresponding alignment indicators. However, the execution of the activities may be controlled in any way (for example, sending orders to humans, commands to machines/programs).

Generally, similar considerations apply if the same solution is implemented with an equivalent method (by using similar steps with the same functions of more steps or portions thereof, removing some non-essential steps or adding further optional steps); moreover, the steps may be performed in a different order, concurrently or in an interleaved way (at least in part).

An embodiment provides a computer program that is configured for causing a computing system to perform the above-mentioned method. An embodiment provides a computer program product, the computer program product comprising a computer readable storage medium having program instructions embodied therewith, the program instructions readable by a computing system to cause the computing system to perform the same method. However, the software program may be implemented as a stand-alone module, as a plug-in for a pre-existing software program (for example, a resource management application), or even directly in the latter. In any case, the solution according to an embodiment of the present disclosure lends itself to be implemented even with a hardware structure (for example, by electronic circuits integrated in one or more chips of semiconductor material), or with a combination of software and hardware suitably programmed or otherwise configured.

An embodiment provides a system comprising means configured for performing each of the steps of the above-mentioned method. An embodiment provides a system comprising a circuitry (i.e., any hardware suitably configured, for example, by software) configured for performing each of the steps of the same method. However, the system may comprise any number and type of computing machines (for example, of physical and/or virtual type) and it may have any architecture (distributed with the computing machines communicating among them via any local, wide area, global, cellular or satellite network and exploiting any type of wired and/or wireless connections, or even stand-alone). The described features and embodiments may be combined in any way.

Generally, similar considerations apply if the system has a different structure or comprises equivalent software components or it has other operative characteristics. In any case, every component thereof may be separated into more elements, or two or more components may be combined together into a single element; moreover, each component may be replicated to support the execution of the corresponding operations in parallel. Moreover, unless specified otherwise, any interactivity between different components generally does not need to be continuous, and it may be either direct or indirect through one or more intermediaries.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 5:
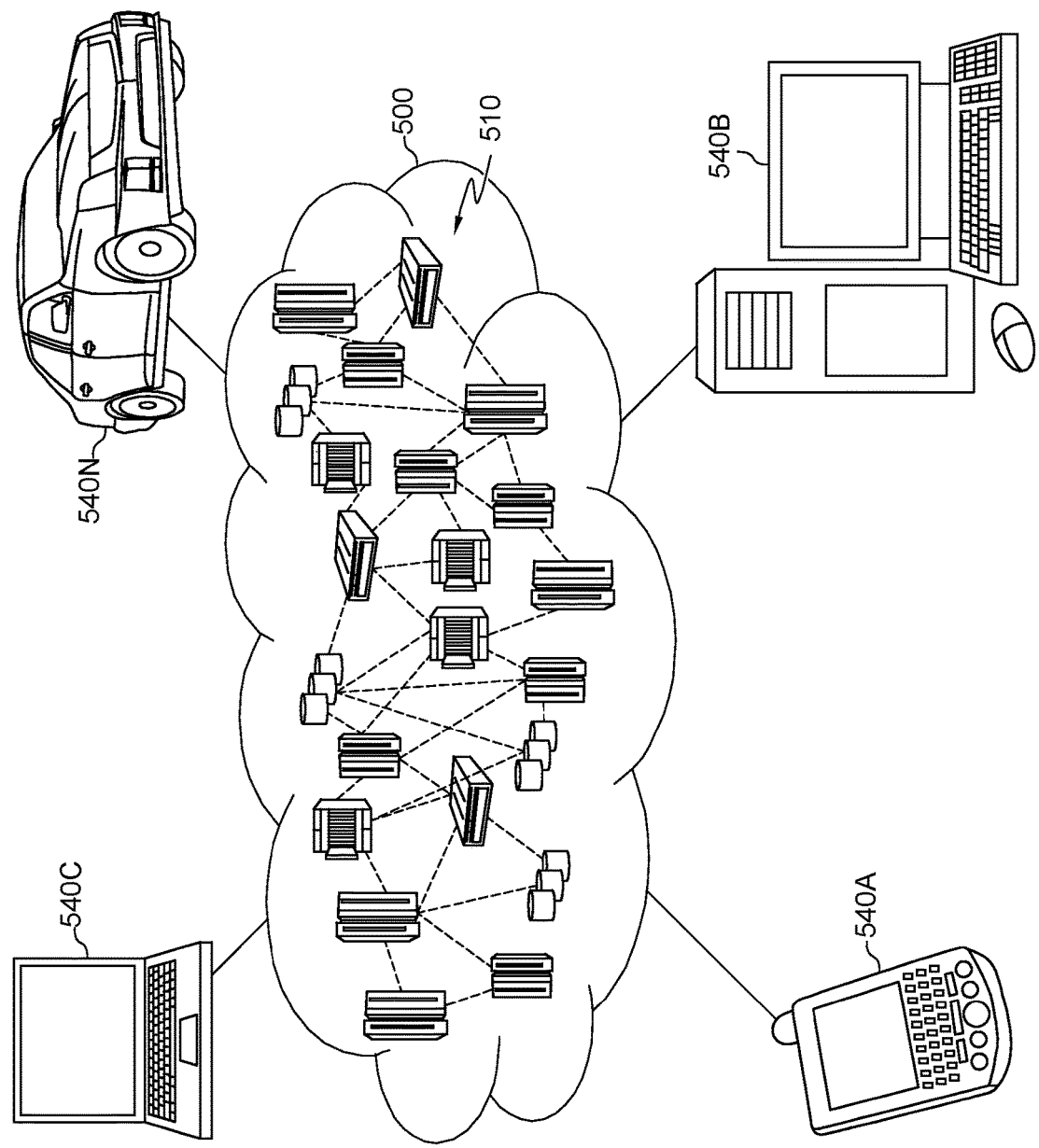
FIG. 5 depicts a cloud computing environment according to an embodiment of the present invention.

Referring now to FIG. 5, illustrative cloud computing environment 500 is depicted. As shown, cloud computing environment 500 includes one or more cloud computing nodes 510 with which local computing devices used by cloud consumers, such as, for example, personal digital assistant (PDA) or cellular telephone 540A, desktop computer 540B, laptop computer 540C, and/or automobile computer system 540N may communicate. Cloud computing nodes 510 may communicate with one another. They may be grouped (not shown) physically or virtually, in one or more networks, such as Private, Community, Public, or Hybrid clouds as described hereinabove, or a combination thereof. This allows cloud computing environment 500 to offer infrastructure, platforms and/or software as services for which a cloud consumer does not need to maintain resources on a local computing device. It is understood that the types of computing devices 540A-N shown in FIG. 5 are intended to be illustrative only and that cloud computing nodes 510 and cloud computing environment 500 can communicate with any type of computerized device over any type of network and/or network addressable connection (e.g., using a web browser).

Figure 6:
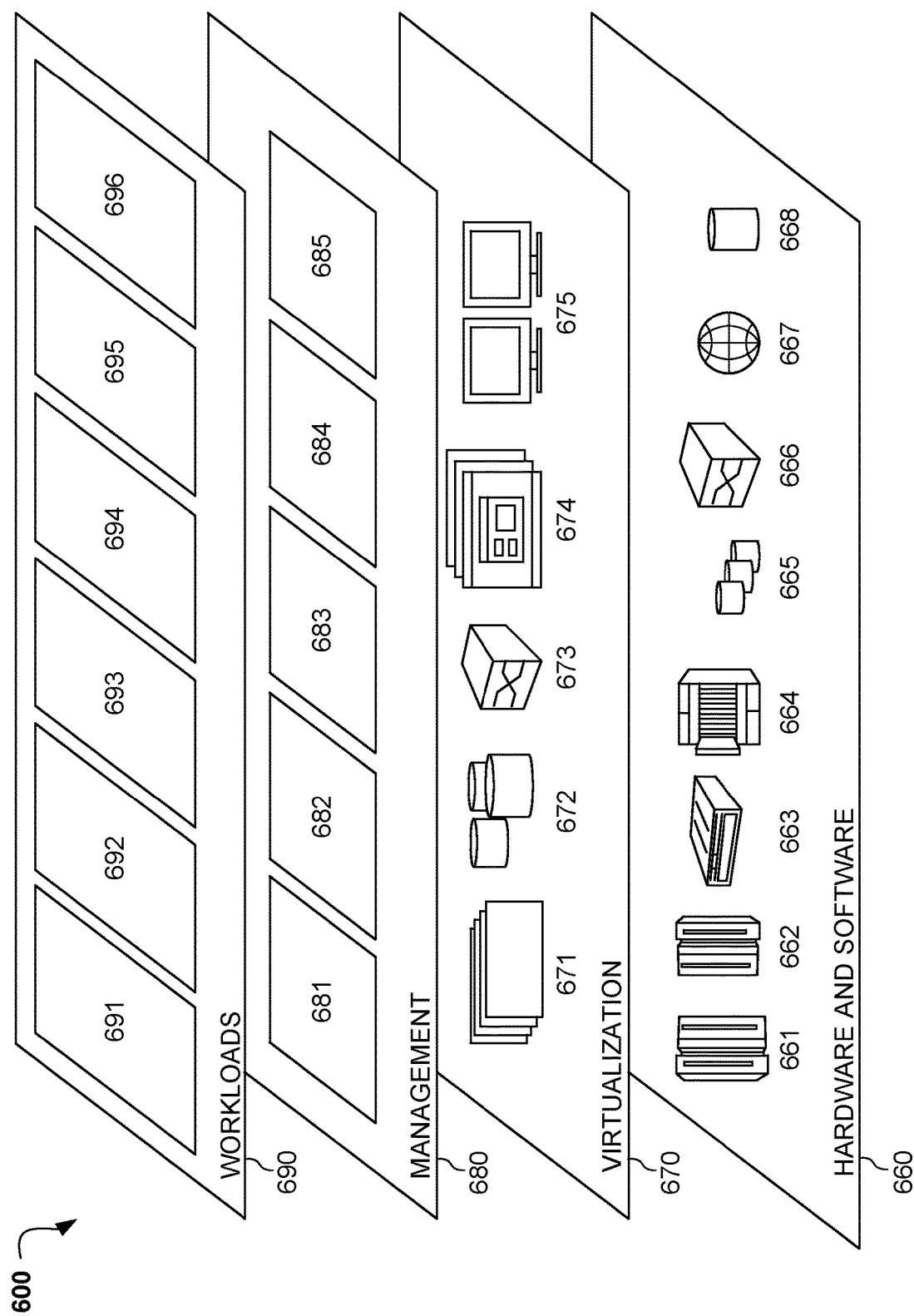
FIG. 6 depicts abstraction model layers according to an embodiment of the present invention.

Referring now to FIG. 6, a set of functional abstraction layers provided by cloud computing environment 500 (as shown in FIG. 5) is shown. It should be understood in advance that the components, layers, and functions shown in FIG. 6 are intended to be illustrative only and embodiments of the invention are not limited thereto. As depicted, the following layers and corresponding functions are provided:

Hardware and software layer 660 includes hardware and software components. Examples of hardware components include: mainframes 661; RISC (Reduced Instruction Set Computer) architecture based servers 662; servers 663; blade servers 664; storage devices 665; and networks and networking components 666. In some embodiments, software components include network application server software 667 and database software 668.

Virtualization layer 670 provides an abstraction layer from which the following examples of virtual entities may be provided: virtual servers 671; virtual storage 672, for example the data storage device 114 as shown in FIG. 1; virtual networks 673, including virtual private networks; virtual applications and operating systems 674; and virtual clients 675.

In an example, management layer 680 may provide the functions described below. Resource provisioning 681 provides dynamic procurement of computing resources and other resources that are utilized to perform tasks within the cloud computing environment. Metering and Pricing 682 provide cost tracking as resources are utilized within the cloud computing environment, and billing or invoicing for consumption of these resources. In an example, these resources may include application software licenses. Security provides identity verification for cloud consumers and tasks, as well as protection for data and other resources. User portal 683 provides access to the cloud computing environment for consumers and system administrators. Service level management 684 provides cloud computing resource allocation and management such that required service levels are met. Service Level Agreement (SLA) planning and fulfillment 685 provide pre-arrangement for, and procurement of, cloud computing resources for which a future requirement is anticipated in accordance with an SLA.

Workloads layer 690 provides examples of functionality for which the cloud computing environment may be utilized. Examples of workloads and functions which may be provided from this layer include: mapping and navigation 691; software development and lifecycle management 692; virtual classroom education delivery 693; data analytics processing 694; transaction processing 695; and management program 696. The management program 696 may relate to managing information technology systems, for example, the method 400.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for managing one or more industrial products, the method comprising:

retrieving, by a computing system, one or more reference artifacts indicative of one or more reference policies implemented by employees for implementing a strategy defining one or more high-level goals of an entity working on information technology systems associated with the industrial products, wherein the one or more reference artifacts are retrieved from a memory of the computing system, and the one or more reference policies comprise publications and communications of the entity;

creating, by a cognitive engine-based modeler of the computing system, a reference model providing a formal representation of the one or more reference policies in terms of a mathematical model conforming to a predefined formalism defined as $Mr=\{\ldots,Sci,\ldots\},\{\ldots,Snj,\ldots\}$, wherein Sci $\{i=1 \ldots N\}$ represents compliance signatures representing one or more technology solutions compliant with the reference policies and Snj $\{j=1 \ldots M\}$ represents non-compliance signatures representing non-compliant technology solutions which do not comply with the one or more reference policies;

retrieving, by the cognitive engine-based modeler, one or more activity artifacts indicative of one or more activities to be performed on the industrial products, wherein the one or more activity artifacts are retrieved from the memory of the computing system, and the one or more activities comprise documentation of the one or more activities to be performed comprising replacement/acquisition of hardware components, installation/upgrade of software programs and development/maintenance of software applications;

creating, by the cognitive engine-based modeler, one or more activity models corresponding to a formal representation of the one or more activities in terms of a mathematical model conforming to the same formalism of the reference model, wherein each of the one or more activity models comprise compliance signatures representing one or more technology solutions compliant with the reference policies and comprises non-compliance signatures representing non-compliant technology solutions non-compliant with the one or more reference policies;

calculating, by the computing system, one or more alignment indicators corresponding to a comparison between the one or more activity models and the reference model according to a compliance index and a non-compliance index, wherein the one or more alignment indicators are based on a comparison of each corresponding activity model with the reference model, wherein the alignment indicators are in binary form, wherein the compliance index comprises a sum of confidence factors of aligned elements E, R and K for each compliant signature, multiplied by a relevance weight of each corresponding aligned element for each of the compliance signatures, where E comprises a binary form representing an alignment of an entity of a corresponding compliance signature, R comprises a binary form representing an alignment of a relationship of the corresponding compliance signature, and K comprises a binary form representing an alignment of a keyword of the corresponding compliance signature, wherein the non-compliance index comprises a sum of confidence factors of aligned elements E, R and K for each non-compliant signature, multiplied by a relevance weight of each corresponding aligned element for each of the non-compliance signatures, where E comprises a binary form representing an alignment of an entity of a corresponding non-compliance signature, R comprises a binary form representing an alignment of a relationship of the corresponding non-compliance signature, and K comprises a binary form representing an alignment of a keyword of the corresponding non-compliance signature;

updating, by the cognitive engine-based modeler, a first activity model of the one or more activity models, wherein the first activity model comprises a first technology solution comprising a non-compliant signature, by replacing the first technology solution with a related technology solution comprising a compliant signature;

determining, by the cognitive engine-based modeler, a first alignment indicator of the first activity model is below an alignment threshold; and based on determining the first alignment indicator of the first activity model is below the alignment threshold, blocking execution of the first activity model by denying corresponding authorizations for acquisition of hardware components.

2. The method according to claim 1, wherein each of the one or more activities comprises an activity signature, the method further comprising:

calculating, by the cognitive engine-based modeler, corresponding compliance indexes for each of the one or more activities by matching elements of the activity signature to elements of the compliance signatures, the compliance indexes indicate compliance of the one or more activities with the reference policies;

calculating, by the cognitive engine-based modeler, corresponding non-compliance indexes for each of the one or more activities by matching elements of the activity signature to elements of the non-compliance signatures, the non-compliance indexes indicate non-compliance of the one or more activities with the reference policies;

calculating, by the cognitive engine-based modeler, the alignment indicators according to the corresponding compliance indexes and the corresponding non-compliance indexes.

3. The method according to claim 2, wherein the compliance signatures, the non-compliance signatures and the activity signatures each comprises one of the sets comprising one of the elements for a context, one of the sets comprising one or more of the elements for corresponding entities, one of the sets comprising one or more of the elements for corresponding relationships among the entities and/or one of the sets comprising one or more of the elements for corresponding keywords.

4. The method according to claim 2, further comprising:

determining, by the cognitive engine-based modeler, the one or more activity models comprising corresponding confidence factors for the elements thereof, each of the confidence factors measuring a confidence of the corresponding element to provide the formal representation of the one or more activities;

calculating, by the cognitive engine-based modeler, the compliance indexes each according to the confidence factors of the elements of the corresponding activity signature matching the elements of the compliance signatures; and calculating, by the cognitive engine-based modeler, the non-compliance indexes each according to the confidence factors of the elements of the corresponding activity signature matching the elements of the non-compliance signatures.

5. The method according to claim 4, further comprising:
correcting, by the cognitive engine-based modeler, the one or more activity models for each of the elements having the corresponding confidence factor not reaching a confidence threshold.

6. The method according to claim 4, further comprising:
creating, by the cognitive engine-based modeler, the reference model comprising corresponding relevance weights for the elements thereof, each of the relevance weights measuring a relevance of the corresponding element to provide the formal representation of the one or more activities;

calculating, by the cognitive engine-based modeler, the compliance indexes each according to the elements of the corresponding activity signature matching the elements of the compliance signatures weighted according to the corresponding relevance weights; and calculating, by the cognitive engine-based modeler, the non-compliance indexes each according to the elements of the corresponding activity signature matching the elements of the non-compliance signatures weighted according to the corresponding relevance weights.

7. The method according to claim 1, further comprising:
setting, by the cognitive engine-based modeler, each of the one or more alignment indicators to an enabling value for enabling execution of the corresponding activity or to a preventing value for preventing execution of the corresponding activity according to a comparison of the alignment indicator with the alignment threshold, wherein the enabling value indicates that execution of the corresponding activity is aligned with the reference policies, and the preventing value indicates that execution of the corresponding activity is not aligned with the reference policies.

8. The method according to claim 7, further comprising:
updating, by the cognitive engine-based modeler, a first activity of the one or more activities by replacing the first activity with a related activity comprising an alignment indicator equal to the enabling value, wherein the alignment indicator for the first activity is equal to the preventing value.

9. A computer program product for managing one or more industrial products, the computer program product comprising:

one or more computer-readable tangible storage medium and program instructions stored on at least one of the one or more tangible storage medium, the program instructions executable by a processor, the program instructions comprising:

program instructions to retrieve, by a computing system, one or more reference artifacts indicative of one or more reference policies implemented by employees for implementing a strategy defining one or more high-level goals of an entity working on information technology systems associated with the industrial products, wherein the one or more reference artifacts are retrieved from a memory of the computing system, and the one or more reference policies comprise publications and communications of the entity;

program instructions to create, by a cognitive engine-based modeler of the computing system, a reference model providing a formal representation of the one or more reference policies in terms of a mathematical model conforming to a predefined formalism defined as $$Mr=\{\ldots,Sci,\ldots\},\{\ldots,Snj,\ldots\},$$

wherein Sci {i=1 ... N} represents compliance signatures representing one or more technology solutions compliant with the reference policies and Snj {j=1 ... M} represents non-compliance signatures representing non-compliant technology solutions which do not comply with the one or more reference policies;

program instructions to retrieve, by the cognitive engine-based modeler, one or more activity artifacts indicative of one or more activities to be performed on the industrial products, wherein the one or more activity artifacts are retrieved from the memory of the computing system, and the one or more activities comprise documentation of the one or more activities to be performed comprising replacement/acquisition of hardware components, installation/upgrade of software programs and development/maintenance of software applications;

program instructions to create, by the cognitive engine-based modeler, one or more activity models corresponding to a formal representation of the one or more activities in terms of a mathematical model conforming to the same formalism of the reference model, wherein each of the one or more activity models comprise compliance signatures representing one or more technology solutions compliant with the reference policies and comprises non-compliance signatures representing non-compliant technology solutions non-compliant with the one or more reference policies;

program instructions to calculate, by the computing system, one or more alignment indicators corresponding to a comparison between the one or more activity models and the reference model according to a compliance index and a non-compliance index, wherein the one or more alignment indicators are based on a comparison of each corresponding activity model with the reference model, wherein the alignment indicators are in binary form, wherein the compliance index comprises a sum of confidence factors of aligned elements E, R and K for each compliant signature, multiplied by a relevance weight of each corresponding aligned element for each of the compliance signatures, where E comprises a binary form representing an alignment of an entity of a corresponding compliance signature, R comprises a binary form representing an alignment of a relationship of the corresponding compliance signature, and K comprises a binary form representing an alignment of a keyword of the corresponding compliance signature, wherein the non-compliance index comprises a sum of confidence factors of aligned elements E, R and K for each non-compliant signature, multiplied by a relevance weight of each corresponding aligned element for each of the non-compliance signatures, where E comprises a binary form representing an alignment of an entity of a corresponding non-compliance signature, R comprises a binary form representing an alignment of a relationship of the corresponding non-compliance signature, and K comprises a binary form representing an alignment of a keyword of the corresponding non-compliance signature;
program instructions to update, by the cognitive engine-based modeler, a first activity model of the one or more activity models, wherein the first activity model comprises a first technology solution comprising a non-compliant signature, by replacing the first technology solution with a related technology solution comprising a compliant signature;
program instructions to determine, by the cognitive engine-based modeler, a first alignment indicator of the first activity model is below an alignment threshold; and
based on determining the first alignment indicator of the first activity model is below the alignment threshold, program instructions to block execution of the first activity model by denying corresponding authorizations for acquisition of hardware components.

10. The computer program product according to claim 9, wherein each of the one or more activities comprises an activity signature, the method further comprising:
program instructions to calculate, by the cognitive engine-based modeler, corresponding compliance indexes for each of the one or more activities by matching elements of the activity signature to elements of the compliance signatures, the compliance indexes indicate compliance of the one or more activities with the reference policies;
program instructions to calculate, by the cognitive engine-based modeler, corresponding non-compliance indexes for each of the one or more activities by matching elements of the activity signature to elements of the non-compliance signatures, the non-compliance indexes indicate non-compliance of the one or more activities with the reference policies;
program instructions to calculate, by the cognitive engine-based modeler, the alignment indicators according to the corresponding compliance indexes and the corresponding non-compliance indexes.

11. The computer program product according to claim 10, wherein the compliance signatures, the non-compliance signatures and the activity signatures each comprises one of the sets comprising one of the elements for a context, one of the sets comprising one or more of the elements for corresponding entities, one of the sets comprising one or more of the elements for corresponding relationships among the entities and/or one of the sets comprising one or more of the elements for corresponding keywords.

12. The computer program product according to claim 10, further comprising:
program instructions to determine, by the cognitive engine-based modeler, the one or more activity models comprising corresponding confidence factors for the elements thereof, each of the confidence factors measuring a confidence of the corresponding element to provide the formal representation of the one or more activities;
program instructions to calculate, by the cognitive engine-based modeler, the compliance indexes each according to the confidence factors of the elements of the corresponding activity signature matching the elements of the compliance signatures; and
program instructions to calculate, by the cognitive engine-based modeler, the non-compliance indexes each according to the confidence factors of the elements of the corresponding activity signature matching the elements of the non-compliance signatures.

13. The computer program product according to claim 12, further comprising:
program instructions to correct, by the cognitive engine-based modeler, the one or more activity models for each of the elements having the corresponding confidence factor not reaching a confidence threshold.

14. The computer program product according to claim 10, further comprising:
program instructions to create, by the cognitive engine-based modeler, the reference model comprising corresponding relevance weights for the elements thereof, each of the relevance weights measuring a relevance of the corresponding element to provide the formal representation of the one or more activities;
program instructions to calculate, by the cognitive engine-based modeler, the compliance indexes each according to the elements of the corresponding activity signature matching the elements of the compliance signatures weighted according to the corresponding relevance weights; and
program instructions to calculate, by the cognitive engine-based modeler, the non-compliance indexes each according to the elements of the corresponding activity signature matching the elements of the non-compliance signatures weighted according to the corresponding relevance weights.

15. The computer program product according to claim 9, further comprising:
program instructions to set, by the cognitive engine-based modeler, each of the one or more alignment indicators to an enabling value for enabling execution of the corresponding activity or to a preventing value for preventing execution of the corresponding activity according to a comparison of the alignment indicator with the alignment threshold, wherein the enabling value indicates that execution of the corresponding activity is aligned with the reference policies, and the preventing value indicates that execution of the corresponding activity is not aligned with the reference policies.

16. The computer program product according to claim 15, further comprising:
program instructions to update, by the cognitive engine-based modeler, a first activity of the one or more activities by replacing the first activity with a related activity comprising an alignment indicator equal to the enabling value, wherein the alignment indicator for the first activity is equal to the preventing value.

17. A computer system for managing one or more industrial products, the computer system comprising:
one or more computer processors, one or more computer-readable storage media, and program instructions stored on the one or more of the computer-readable storage media for execution by at least one of the one or more processors, the program instructions comprising:
program instructions to retrieve, by a computing system, one or more reference artifacts indicative of one or more reference policies implemented by employees for implementing a strategy defining one or more high-level goals of an entity working on information technology systems associated with the industrial products, wherein the one or more reference artifacts are retrieved from a memory of the computing system, and the one or more reference policies comprise publications and communications of the entity;

program instructions to create, by a cognitive engine-based modeler of the computing system, a reference model providing a formal representation of the one or more reference policies in terms of a mathematical model conforming to a predefined formalism defined as $Mr=\{\ldots,Sci,\ldots\},\{\ldots,Snj,\ldots\},$ wherein Sci {i=1 ... N} represents compliance signatures representing one or more technology solutions compliant with the reference policies and Snj {j=1 ... M} represents non-compliance signatures representing non-compliant technology solutions which do not comply with the one or more reference policies;

program instructions to retrieve, by the cognitive engine-based modeler, one or more activity artifacts indicative of one or more activities to be performed on the industrial products, wherein the one or more activity artifacts are retrieved from the memory of the computing system, and the one or more activities comprise documentation of the one or more activities to be performed comprising replacement/acquisition of hardware components, installation/upgrade of software programs and development/maintenance of software applications;

program instructions to create, by the cognitive engine-based modeler, one or more activity models corresponding to a formal representation of the one or more activities in terms of a mathematical model conforming to the same formalism of the reference model, wherein each of the one or more activity models comprise compliance signatures representing one or more technology solutions compliant with the reference policies and comprises non-compliance signatures representing non-compliant technology solutions non-compliant with the one or more reference policies;

program instructions to calculate, by the computing system, one or more alignment indicators corresponding to a comparison between the one or more activity models and the reference model according to a compliance index and a non-compliance index, wherein the one or more alignment indicators are based on a comparison of each corresponding activity model with the reference model, wherein the alignment indicators are in binary form, wherein the compliance index comprises a sum of confidence factors of aligned elements E, R and K for each compliant signature, multiplied by a relevance weight of each corresponding aligned element for each of the compliance signatures, where E comprises a binary form representing an alignment of an entity of a corresponding compliance signature, R comprises a binary form representing an alignment of a relationship of the corresponding compliance signature, and K comprises a binary form representing an alignment of a keyword of the corresponding compliance signature, wherein the non-compliance index comprises a sum of confidence factors of aligned elements E, R and K for each non-compliant signature, multiplied by a relevance weight of each corresponding aligned element for each of the non-compliance signatures, where E comprises a binary form representing an alignment of an entity of a corresponding non-compliance signature, R comprises a binary form representing an alignment of a relationship of the corresponding non-compliance signature, and K comprises a binary form representing an alignment of a keyword of the corresponding non-compliance signature;

program instructions to update, by the cognitive engine-based modeler, a first activity model of the one or more activity models, wherein the first activity model comprises a first technology solution comprising a non-compliant signature, by replacing the first technology solution with a related technology solution comprising a compliant signature;

program instructions to determine, by the cognitive engine-based modeler, a first alignment indicator of the first activity model is below an alignment threshold; and based on determining the first alignment indicator of the first activity model is below the alignment threshold, program instructions to block execution of the first activity model by denying corresponding authorizations for acquisition of hardware components.

18. The computer system according to claim 17, wherein each of the one or more activities comprises an activity signature, the method further comprising:

program instructions to calculate, by the cognitive engine-based modeler, corresponding compliance indexes for each of the one or more activities by matching elements of the activity signature to elements of the compliance signatures, the compliance indexes indicate compliance of the one or more activities with the reference policies;

program instructions to calculate, by the cognitive engine-based modeler, corresponding non-compliance indexes for each of the one or more activities by matching elements of the activity signature to elements of the non-compliance signatures, the non-compliance indexes indicate non-compliance of the one or more activities with the reference policies;

program instructions to calculate, by the cognitive engine-based modeler, the alignment indicators according to the corresponding compliance indexes and the corresponding non-compliance indexes.

19. The computer system according to claim 18, wherein the compliance signatures, the non-compliance signatures and the activity signatures each comprises one of the sets comprising one of the elements for a context, one of the sets comprising one or more of the elements for corresponding entities, one of the sets comprising one or more of the elements for corresponding relationships among the entities and/or one of the sets comprising one or more of the elements for corresponding keywords.

20. The computer system according to claim 18, further comprising:

program instructions to determine, by the cognitive engine-based modeler, the one or more activity models comprising corresponding confidence factors for the elements thereof, each of the confidence factors measuring a confidence of the corresponding element to provide the formal representation of the one or more activities;

program instructions to calculate, by the cognitive engine-based modeler, the compliance indexes each according to the confidence factors of the elements of the corresponding activity signature matching the elements of the compliance signatures; and program instructions to calculate, by the cognitive engine-based modeler, the non-compliance indexes each according to the confidence factors of the elements of the corresponding activity signature matching the elements of the non-compliance signatures.

* * * * *